United States Patent
Ohmert (10) Patent No.: US 10,409,893 B2
(45) Date of Patent: Sep. 10, 2019

(54) VEHICLE PROFILE DEVELOPMENT

(71) Applicant: INRIX INC., Kirkland, WA (US)

(72) Inventor: Steven Timothy Ohmert, Vashon, WA (US)

(73) Assignee: INRIX, Inc., Kirkland, WA (US)

( * ) Notice: Subject to any disclaimer, the term of this patent is extended or adjusted under 35 U.S.C. 154(b) by 472 days.

(21) Appl. No.: 15/351,756

(22) Filed: Nov. 15, 2016

(65) Prior Publication Data

US 2018/0137088 A1    May 17, 2018

(51) Int. Cl.
*G06F 17/21*    (2006.01)
*B60K 35/00*    (2006.01)
(Continued)

(52) U.S. Cl.
CPC ............ *G06F 17/211* (2013.01); *B60K 35/00* (2013.01); *G06F 3/04817* (2013.01); *G06F 3/04845* (2013.01); *H04L 67/12* (2013.01); *H04W 4/40* (2018.02); *B60K 2350/1096* (2013.01); *B60K 2350/357* (2013.01)

(58) Field of Classification Search
CPC ............... G06F 17/211; G06F 3/04817; G06F 3/04845; H04W 4/40; B60K 35/00; H04L 67/12

See application file for complete search history.

(56) References Cited

U.S. PATENT DOCUMENTS

2002/0161820 A1    10/2002   Pelligrino et al.
2005/0085963 A1    4/2005    Kapolka et al.
(Continued)

FOREIGN PATENT DOCUMENTS

EP    2461545 A1    6/2012

OTHER PUBLICATIONS

Bong-ju Ahn et al., "Development of a Controller Area Network Interface Unit and Its Application to a Fuel Cell Hybrid Electric Vehicle," 2006 [retrieved on Apr. 24, 2019], 2006 SICE-ICASE International Joint Conference, pp. 5545-5549, downloaded from <url>: https://ieeexplore.ieee.org. (Year: 2006).*

(Continued)

*Primary Examiner* — Thuy Dao
*Assistant Examiner* — Stephen D Berman
(74) *Attorney, Agent, or Firm* — Cooper Legal Group, LLC (57) ABSTRACT

One or more techniques and/or systems are provided for developing and facilitating the development of a vehicle profile for a vehicle. An application developer may experience difficulty when developing applications that are to interact with a vehicle computing device of a vehicle due to proprietary software, communication protocols, data formats, etc. Accordingly, a vehicle profile may be developed to act as an intermediary abstraction layer between the application and the vehicle computing device. A profile developer can define how to process certain types of input from the application, what vehicle signal information can be accessed by the application, how information such as a user interface of the application is to be displayed such as through a vehicle navigation unit, what vehicle parameters can be modified by the application, etc. In this way, the application can interact with the vehicle computing device through the vehicle profile.

20 Claims, 8 Drawing Sheets

(51) Int. Cl.
*G06F 3/0481* (2013.01)
*G06F 3/0484* (2013.01)
*H04L 29/08* (2006.01)
*H04W 4/40* (2018.01)

(56) References Cited

U.S. PATENT DOCUMENTS

| | | | |
|---|---|---|---|
| 2013/0036113 A1* | 2/2013 | Damera-Venkata | G06F 17/211 707/724 |
| 2014/0101542 A1* | 4/2014 | Albrecht | G06F 17/211 715/256 |
| 2014/0306814 A1* | 10/2014 | Ricci | H04W 4/21 340/425.5 |
| 2015/0112512 A1* | 4/2015 | Fan | H04L 67/12 701/2 |
| 2015/0301794 A1* | 10/2015 | Danne | G06F 3/167 715/728 |
| 2016/0352715 A1* | 12/2016 | Saini | H04L 67/12 |
| 2018/0097804 A1* | 4/2018 | Boehm | H04W 12/06 |

OTHER PUBLICATIONS

Alessio Bucaioni et al., "From Modeling to Deployment of Component-Based Vehicular Distributed Real-Time Systems," 2014 [retrieved on Apr. 4, 2019], 11th International Conference on Information Technology: New Generations, pp. 649-654, downloaded from <url>:https://ieeexplore.ieee.org. (Year: 2014).*

Robert Baillargeon, "Vehicle System Development: A Challenge of Ultra-Large-Scale Systems," 2007 [retrieved on Apr. 24, 2019], International Workshop on Software Technologies for Ultra-Large-Scale Systems, pp. 1-6, downloaded from <url>:https://ieeexplore.ieee.org. (Year: 2007).*

Int. Search Report/Written Opinion cited in PCT Application No. PCT/US2017/060747 dated Jan. 19, 2018, 10 pgs.

* cited by examiner

VEHICLE PROFILE DEVELOPMENT

BACKGROUND

Many vehicles comprise vehicle computing devices that control various aspects of a vehicle's operation. For example, a vehicle computing device of a vehicle may monitor engine temperature, control engine operation, implement cruise control settings, etc. The vehicle computing device may communicate over a vehicle controller area network (CAN) bus with other vehicle components. The vehicle computing device and the vehicle components may communicate using proprietary communication protocols and data formats. The vehicle may also comprise a vehicle navigation unit through which a user can adjust a radio, view navigational information, etc. The vehicle navigation unit may come preprogrammed from a vehicle manufacturer, and may use the same proprietary communication protocols and data formats of the vehicle computing device and vehicle components. Unfortunately, developing applications, such as a third party application, capable of communicating with the vehicle computing device, vehicle components, and/or the vehicle navigation unit may be difficult because of the proprietary nature of such components and computing devices.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for developing and/or facilitating the development of a vehicle profile are provided. In an example, a vehicle profile development environment may be exposed, such as to a profile developer (e.g., a car maker or an original equipment manufacturer (OEM) that wants to develop a vehicle profile that can be used by application developers, such as third party developers, to create applications (e.g., any type of software or program that can execute on computing hardware, such as a desktop application, a mobile app, a web service, wearable device software, etc.) capable of communicating and interacting with a vehicle computing device, a vehicle navigation unit, and/or vehicle components of a vehicle for which the vehicle profile is defined). The vehicle profile development environment may allow the profile developer to define a general vehicle attribute, for the vehicle profile, specifying how the application is allowed to access a general feature of the vehicle (e.g., the general feature may be a common feature across various vehicle models, such as an engine temperature feature, an outside temperature feature, a radio status feature, a parking brake feature, etc.). The vehicle profile development environment may allow the profile developer to define a vehicle specific attribute, for the vehicle profile, specifying how the application is allowed to access a vehicle specific feature of the vehicle (e.g., the vehicle specific feature may be specific to a certain vehicle model, such as a convertible top feature).

The vehicle profile development environment may allow the profile developer to define an input type rule, for the vehicle profile, specifying how the vehicle profile is to interpret input received from the application (e.g., the vehicle profile may allow certain voice commands but not others). The vehicle profile development environment may allow the profile developer to define a notification rule, for the vehicle profile, specifying what notifications can be provided to a user of the application based upon signal information output by the vehicle computing device of the vehicle (e.g., what vehicle operational information, such as engine temperature, is allowed to be accessed and provided to the user by the application).

The vehicle profile development environment may allow the profile developer to define a display rule, for the vehicle profile, specifying how to visually format information from the application for display through a display of the vehicle computing device such as a display of the vehicle navigation unit (e.g., the vehicle profile may specify font types and sizes, resolutions, color schemes, a display region allocated to a user interface of the application, and/or other visual parameters as to how text, images, emails, social network posts, videos, or other information is to be formatted for display). In this way, the profile developer may define various rules for the vehicle profile, such as what information the application is allowed to access. The application can communicate and interface with the vehicle computing device through the vehicle profile. The vehicle profile acts as an intermediary abstraction layer with application programming interfaces, data format conversion functionality (e.g., the ability to convert a request or command by the application from a format understood by the application to a format understood by the vehicle computing device and vice versa), communication functionality, and/or rules and policies (e.g., the vehicle profile may grant or deny access to certain vehicle information).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

One or more computing devices and/or techniques for developing and/or facilitating the development of a vehicle profile are provided. A vehicle manufacturer may produce a wide variety of vehicle models with various features and components that may come standard or optional. A vehicle may be equipped with a vehicle computing device that communicates over a vehicle controller area network (CAN) bus with other vehicle components in order to control and monitor operation of the vehicle. The vehicle computing device may comprise or use proprietary software, proprietary communication functionality, a proprietary data format, etc. The vehicle may also come with a vehicle navigation unit through which the user may access functionality of the vehicle, such as a radio, climate settings, etc. The vehicle navigation unit may be preprogrammed to comprise or use proprietary software, the proprietary communication functionality, the proprietary data format, etc.

Unfortunately, development of applications (e.g., applications that can be hosted by a device, such as a mobile device, a smart phone, a wearable device, a smart watch, etc.; applications that can be hosted by the vehicle navigation unit or other vehicle computing devices; etc.) that can interact with the vehicle is difficult or impossible such as for third party developers due to incompatibilities or lack of knowledge regarding the proprietary software, the proprietary communication functionality, the proprietary data format, etc. used by the vehicle. Thus, an application developer may spend substantial amounts of time and computing resources attempting to develop applications that are compatible with such vehicles. The application developer may have to re-write the application for each type of vehicle model, which is impractical. Further, the vehicle manufacturer may desire to not expose all information relating to how the vehicle computing device and functionality operate due to security reasons and practicality reasons.

Accordingly, as provided herein, a vehicle profile development environment is provided so that a profile developer, such as a vehicle manufacturer, may create a vehicle profile for a vehicle. The vehicle profile may provide abstraction and separation from the underlying controls, protocols, data formats, and/or other proprietary elements of the vehicle. In this way, an application developer may develop a single application that can interface with various types of vehicles using appropriate vehicle profiles without the need to write or re-write separate applications for each vehicle type or model. In this way, the profile developer can create the vehicle profile to abstract and separate away the details of the vehicle without explosive proprietary and sensitive information about the vehicle. For example, the vehicle profile may be used to either allow or deny access by the application to various features, vehicle data signals, and vehicle components. The vehicle profile may format communication from the application into a format understood by the vehicle. Similarly, the vehicle profile my format signals from the vehicle into a format understood by the application, such as into a contextual concept (e.g., engine speed signals may be transformed into vehicle speed concept).

The vehicle profile may abstract away the details of displaying information on a display of a vehicle computing device, such as a display of a vehicle navigation unit (e.g., the vehicle profile may specify a font, color scheme, resolution, and/or other display properties for user interface elements, images, videos, text, etc. that the application wants to display). In this way, internal policies (e.g., to enhance security by allowing or denying access to read certain information or modify certain parameters), preferences (e.g., what can be displayed and how such information is allowed to be displayed), and capabilities can be specified by the profile vehicle. The vehicle profile can be implemented in various platforms and data formats, such as HyperText Markup Language (HTML) 5, an online rich text editor, etc. Application developers can develop richer applications (e.g., an application executing on a vehicle computing device or an application executing on a remote device such as a mobile device) that can easily interact with a variety of different vehicles in a secure manner (e.g., without exposing sensitive proprietary vehicle information to the application) using vehicle profiles developed through the vehicle profile development environment.

Figure 1:
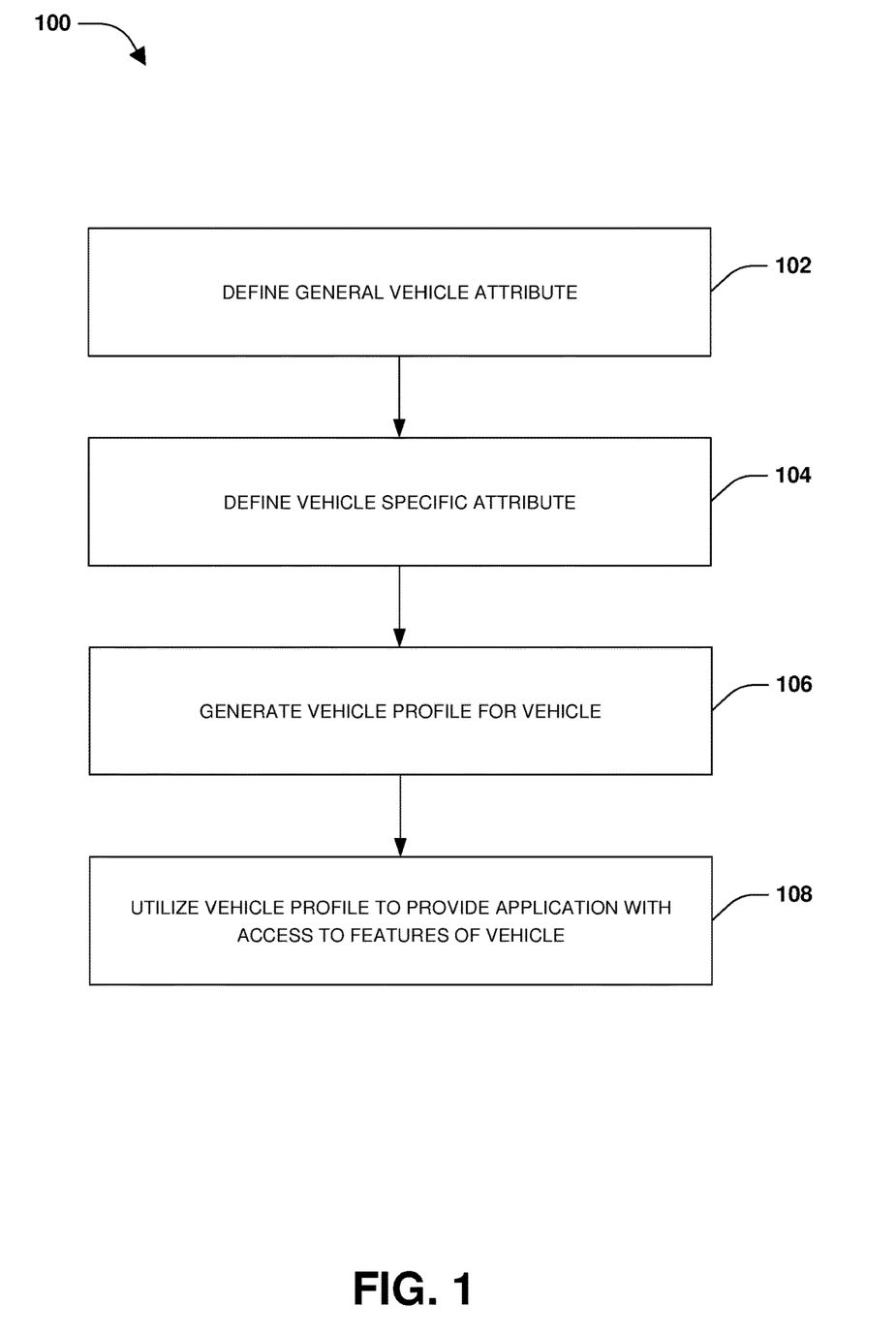
FIG. 1 is a flow diagram illustrating an exemplary method of developing a vehicle profile.

An embodiment of developing a vehicle profile is illustrated by an exemplary method 100 of FIG. 1. In an example, a vehicle profile development environment may be provided for developing the vehicle profile. At 102, a general vehicle attribute, specifying how an application is allowed to access a general feature of a vehicle, may be defined such as through the vehicle profile development environment for inclusion within the vehicle profile. The general vehicle attribute may relate to a vehicle attribute that may be common amongst various vehicle makes or models, such as a cruise control attribute, a radio on/off status attribute, an oil temperature status attribute, etc. In this way, various general vehicle attributes of the vehicle may be defined in a manner that allows the vehicle profile to be an abstraction layer that provides access to such general vehicle attributes even though the application may not natively understand proprietary data formats, communications protocols, and/or other specifics regarding how to directly access and interpret such information from a vehicle computing device or signals over a CAN bus.

At 104, a specific vehicle attribute, specifying how the application is allowed to access a vehicle specific feature of a vehicle, may be defined such as through the vehicle profile development environment for inclusion within the vehicle profile. The specific vehicle attribute may relate to a vehicle attribute that is specific to a certain vehicle, like an all-wheel drive attribute, a convertible top position attribute, a sports mode attribute, a fuel cell charge attribute, etc. In this way, various specific vehicle attributes of the vehicle may be defined in a manner that allows the vehicle profile to be an abstraction layer that provides access to such specific vehicle attributes even though the application may not natively understand the proprietary data formats, communications protocols, and/or other specifics regarding how to directly access and interpret such specific information from the vehicle computing device or signals over the CAN bus.

It may be appreciated that a variety of rules, actions, display properties, and/or other functions may be defined for the vehicle profile. In an example, an attribute, specifying an action that a vehicle computing device will perform in response to an input command from the application, may be defined. For example, the attribute may specify that the vehicle computing device will turn on a rear defroster based upon a voice command "rear defroster on" input through the application. In this way, various attributes can be define to map various input commands (e.g., voice commands, a command received through a mobile device hosting the application, interactions with a user interface such as a button press, gesture commands, eye tracking commands, biosensor commands such as a highly elevated heartrate used to place a 911 call or slow an autonomous vehicle to a stop on a side of the road, etc.) to certain actions.

In another example, a first set of features, that are allowed to be accessed by the application, may be specified within the vehicle profile. For example, the application may be allowed to read engine temperature values, modify a position of a sunroof, modify a satellite radio station, display a user interface through a display of the vehicle (e.g., display social network posts or emails through a user interface), etc. A second set of features, that are not allowed to be accessed by the application, may be specified within the vehicle profile or features that are not allowed to be accessed may be left out of the first set of features thus indicating that any features not within the first set of features are inaccessible to the application. For example, the application may be restricted from accessing certain autonomous vehicle driving parameters.

In another example, a display resolution property, for displaying information from the application through a vehicle computing device (e.g., a display of a vehicle navigation unit), may be specified within the vehicle profile. For example, the display resolution property may be set for various vehicle navigation unit display resolutions. In another example, graphical user interface display properties, for displaying information from the application through the vehicle computing device, may be specified within the vehicle profile. For example, graphical user interface display properties may specify a user interface color scheme, a background for a user interface (e.g., a background image with a faded logo of a vehicle manufacturer), a font type, a size and location allocated for a user interface of the application (e.g., only half of the display of the vehicle navigation unit may be allocated to the user interface of the application), etc. In another example, a display rule, for displaying information from the application through the vehicle computing device, may be specified within the vehicle profile. For example, the application may be allowed to display a restaurant reservation user interface populated with restaurant information such as hours of operation and phone number, but may be restricted from displaying a menu of the restaurant. In another example of the display rule, the application may be allowed to display social network posts limited to 100 characters but must truncate any social network posts over 100 characters. In this way, the vehicle profile may be used to constrain applications to using user interfaces with a particular look and feel.

In another example, input types, used to access features of the vehicle, may be specified within the vehicle profile. For example, the vehicle profile may define what input commands or types of inputs (e.g., gesture rules, voice commands, user interface buttons and knobs, etc.) are acceptable (e.g., the vehicle profile may transform any acceptable input from the application into a formatted command understood by the vehicle computing device). In another example, event logging, that is allowed to be performed for signal information output by the vehicle computing device, may be specified within the vehicle profile. For example, the application may be allowed to collect and log engine temperature values for data collection purposes, display to a user, to provide to a server for further processing, etc., but may be restricted from collecting and logging fuel consumption data. In this way, an event logging rule may specify what telemetry is accessible to the application. In another example, notification rules, defining what notifications can be provided to a user of the application or sent to a remote server for further processing based upon signal information output by the vehicle computing device, may be specified within the vehicle profile. For example, the application may be allowed to display fuel consumption information but not brake sensor information.

At 106, the vehicle profile may be generated for the vehicle based upon the general vehicle attribute, the vehicle specific attribute, and/or any other rules, attributes, or information specified within the vehicle profile. At 108, the vehicle profile may be utilized to provide the application with access to features of the vehicle. The vehicle profile may be used as an intermediary abstraction layer between the application and the vehicle computing device. In an example, information and a context describing the information may be received from the application by the vehicle profile. For example, the application may provide point of interest information for a museum (e.g., hours of operation, a coupon, a current showcase exhibit, etc.) and a context describing the point of interest information. The vehicle profile may be used to determine a display scheme regarding how to display the information based upon the context (e.g., the vehicle profile may apply a color scheme, resolution, font, size, and/or other visual parameters to the point of interest information for display). The vehicle profile may also format the information into formatted information having a format understood by the vehicle computing device. In an example, the vehicle profile may format the information from a first type such as text to a second type such as audio output for playback through the vehicle. In this way, the vehicle profile may invoke the vehicle computing device to display the information based upon the display scheme. In an example, a first portion of the information may be displayed based upon a display rule within the vehicle profile (e.g., the hours of operation and coupon may be displayed), however, a second portion of the information may be restricted from being displayed based upon the display rule (e.g., the current showcase exhibit may be restricted from being display based upon various factors such as a based upon a topic of the content, a size or amount of content, etc.).

In an example, supplementary information, not comprised within the information received from the application, may be identified based upon the vehicle profile (e.g., a logo, an image of a car component such as a convertible top if the information relates to a position of the convertible top, etc.). For example, current weather information for the point of interest may be identified. The vehicle computing device may be invoked to display the supplementary information.

In an example, the vehicle profile may be utilized to receive signal information from the vehicle computing device, such as over the CAN bus (e.g., engine temperature values). The vehicle profile may be use to format the signal information into a contextual concept understood by the application (e.g., an engine temperature value of "normal"). The contextual concept may be provided from the vehicle profile to the application.

In an example, the vehicle profile may be used to receive an update from the application. The update may comprise information used to update the vehicle profile, such as to add a new attribute associated with a new feature for the vehicle, change access rights to a feature of the vehicle (e.g., add, remove, or modify access to the feature), etc. In this way, the update may be applied to the vehicle profile to create an update vehicle profile.

Figure 2:
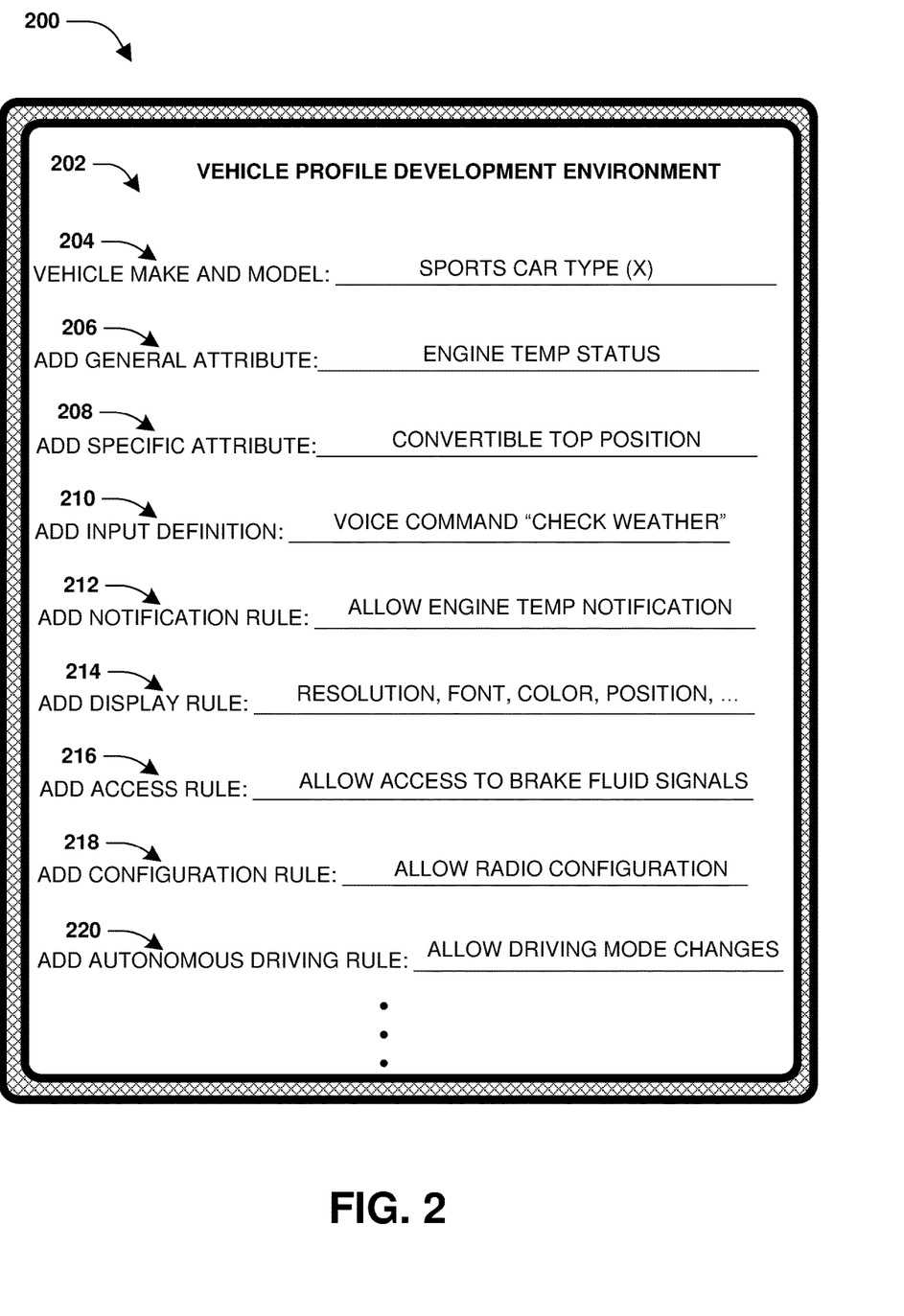
FIG. 2 is a component block diagram illustrating an exemplary system for providing a vehicle profile development environment for developing a vehicle profile.

FIG. 2 illustrates an example of a system 200 for providing a vehicle profile development environment 202 through which a profile developer may generate a vehicle profile used to facilitate interaction between an application and a vehicle. The vehicle profile development environment 202 may be populated with a vehicle model definition interface 204, a general attribute definition interface 206, a vehicle specific attribute definition interface 208, an input type definition interface 210, a notification rule definition interface 212, a display rule definition interface 214, an access rule definition interface 216, a configuration definition interface 218, an autonomous driving rule definition interface 220, etc.

The profile developer may specify, through the vehicle model definition interface 204, a vehicle make and model for which the vehicle profile is applicable (e.g., the vehicle profile may be defined for and integrated into a sports car type (X) vehicle). The profile developer may specify, through the general attribute definition interface 206, a general attribute for the vehicle profile (e.g., the general attribute may define what is an engine temperature status attribute, such as how to access and/or interpret engine temperature data). The profile developer may specify, through the vehicle specific attribute definition interface 208, a vehicle specific attribute for the vehicle profile (e.g., the vehicle specific attribute may define what is a convertible top position attribute, such as how to access and/or interpret convertible top data). The profile developer may specify, through the input type definition interface 210, an input type definition defining an input type rule specifying how the vehicle profile is to interpret input received from the application accessing a feature of the vehicle (e.g., the vehicle profile may be configured to obtain and display weather information in response to a user inputting a voice command "check weather" through the application).

The profile developer may specify, through the notification rule definition interface 212, a notification rule definition defining a notification rule specifying what notifications can be provided to a user of the application based upon signal information output by the vehicle computing device of the vehicle (e.g., the application may be allowed to access and provide engine temperature data to the user). The profile developer may specify, through the display rule definition interface 214, a display rule definition defining a display rule specifying how to visually format information from the application for display through a display of the vehicle computing device (e.g., a font type and size, a resolution, a color scheme, a position or region within the display that can be used by the application). The profile developer may specify, through the access rule definition interface 216, a signal access rule specifying that a first type of signal information is allowed to be accessed by the application and/or that a second type of signal information is not allowed to be accessed by the application (e.g., the application may be allowed to access brake fluid signal data but not fuel consumption data).

The profile developer may specify, through the configuration definition interface 218, a vehicle configuration rule specifying that a first vehicle parameter is allowed to be modified by the application and/or that a second vehicle parameter is not allowed to be modified by the application (e.g., the application may be allowed to modify a radio station, but may be restricted from modifying a turn signal status). The profile developer may specify, through the autonomous driving rule definition interface 220, a first automated driving vehicle parameter that is allowed to be modified by the application and/or a second automated driving vehicle parameter that is not allowed to be modified by the application (e.g., the application may be allowed to modify a driving mode, but may be restricted from modifying a braking distance attribute). In this way, the vehicle profile may be created through the vehicle profile development environment 202.

Figure 3:
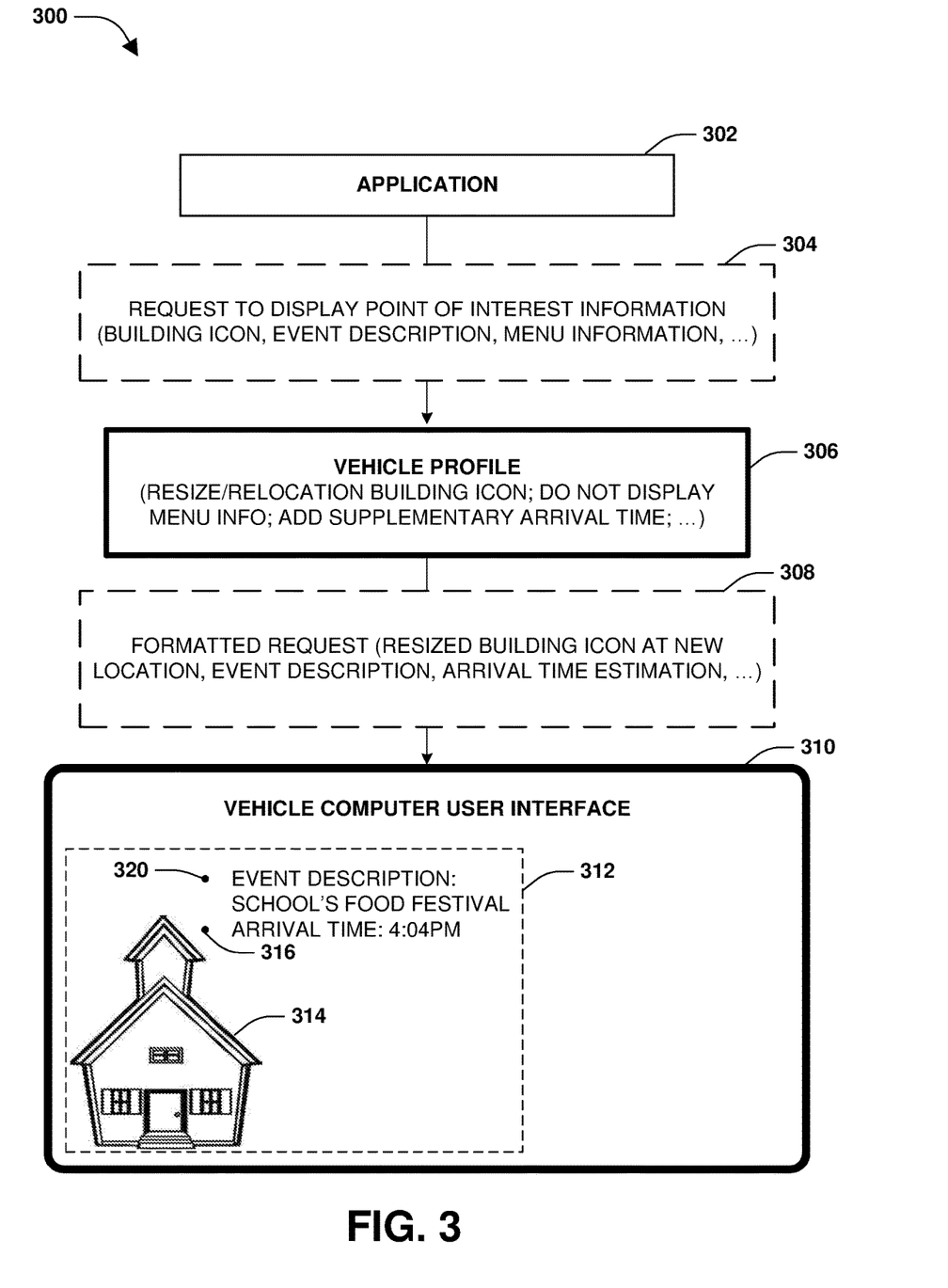
FIG. 3 is a component block diagram illustrating an exemplary system for utilizing a vehicle profile to facilitate interaction between an application and a vehicle computing device.

FIG. 3 illustrates an example of a system 300 for utilizing a vehicle profile 306. An application 302 (e.g., an application hosted by a vehicle navigation unit, an application hosted on a mobile device, etc.) may utilize the vehicle profile 306 (e.g., an abstraction layer between the application 302 and a vehicle computing device of a vehicle, which may provide application programming interfaces (API), data formatting and translation functionality, communication functionality, etc.) to interact with the vehicle. The application 302 may send a request 304, to display point of interest information (e.g., a building icon 314 of a building at which an event is occurring, an event description 320 of the event, menu information for the event, etc.) to the vehicle profile 306.

The vehicle profile 306 may determine that the application 302 is allowed to display point of interest information within a region 312 of a vehicle computer user interface (e.g., a user interface of the vehicle navigation unit). The vehicle profile 306 may apply various rules for processing the request 304. For example, the vehicle profile 306 may resize and relocate the building icon 314 into a lower left corner of the region 312. The vehicle profile 306 may determine that the event description 320 is allowed to be displayed, but the menu information is not allowed to be displayed. The vehicle profile 306 may determine that supplementary arrival time information 316 is available for when the user will reach the building. Accordingly, the vehicle profile 306 may generate a formatted request 308 based upon the processing of the request 304. The formatted request 308 may be in a format that is understood by the vehicle computing device (e.g., the vehicle navigation unit). In this way, the point of interest information may be displayed within the region 312.

Figure 4:
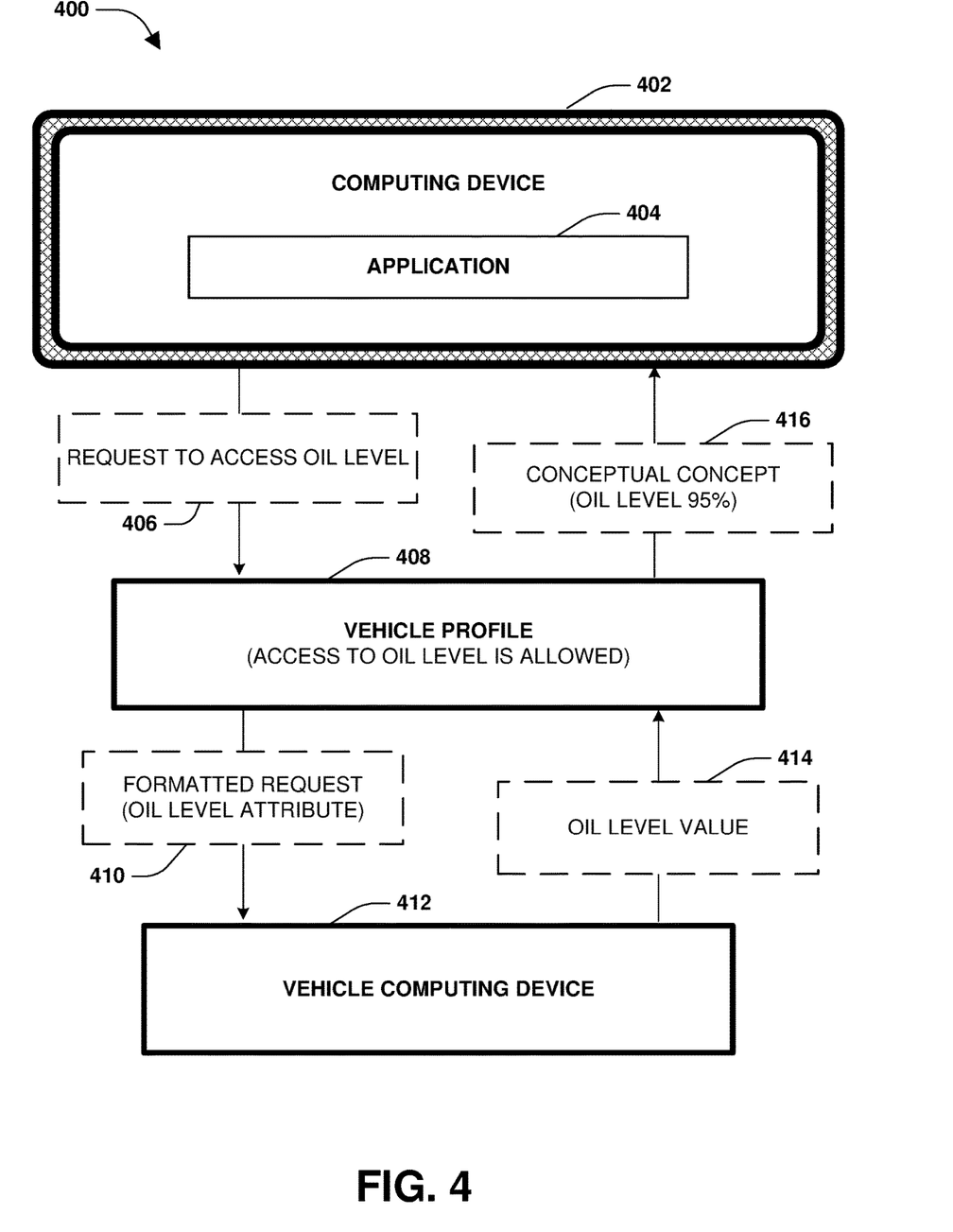
FIG. 4 is a component block diagram illustrating an exemplary system for utilizing a vehicle profile to facilitate interaction between an application and a vehicle computing device, where access to certain vehicle information is allowed.

FIG. 4 illustrates an example of a system 400 for utilizing a vehicle profile 408. A computing device 402 may host an application 404 (e.g., a mobile device hosting a mobile app, an application executing on a device separate from a vehicle such as a wearable device, an application executing on a vehicle navigation unit, etc.). The application may request 406 access to oil level data of a vehicle. The request 406 may be sent to a vehicle profile 408. The vehicle profile 408 may determine that the application 404 is allowed to access the oil level data. Accordingly, the vehicle profile 408 may format the request 406 into a format understood by a vehicle computing device 412 that provides oil level data. In this way, a formatted request 410 may be generated and sent to the vehicle computing device 412. The vehicle profile 408 may receive oil level signal values 414 from the vehicle computing device 412. Because the application 404 may not understand the oil level signal values 414, the vehicle profile 408 may convert the oil level signal values 414 into a conceptual concept 416, such as a percentage of remaining oil, which is understood by the application 404. In this way, the conceptual concept 416 may be provided from the vehicle profile 408 to the application 404.

Figure 5:
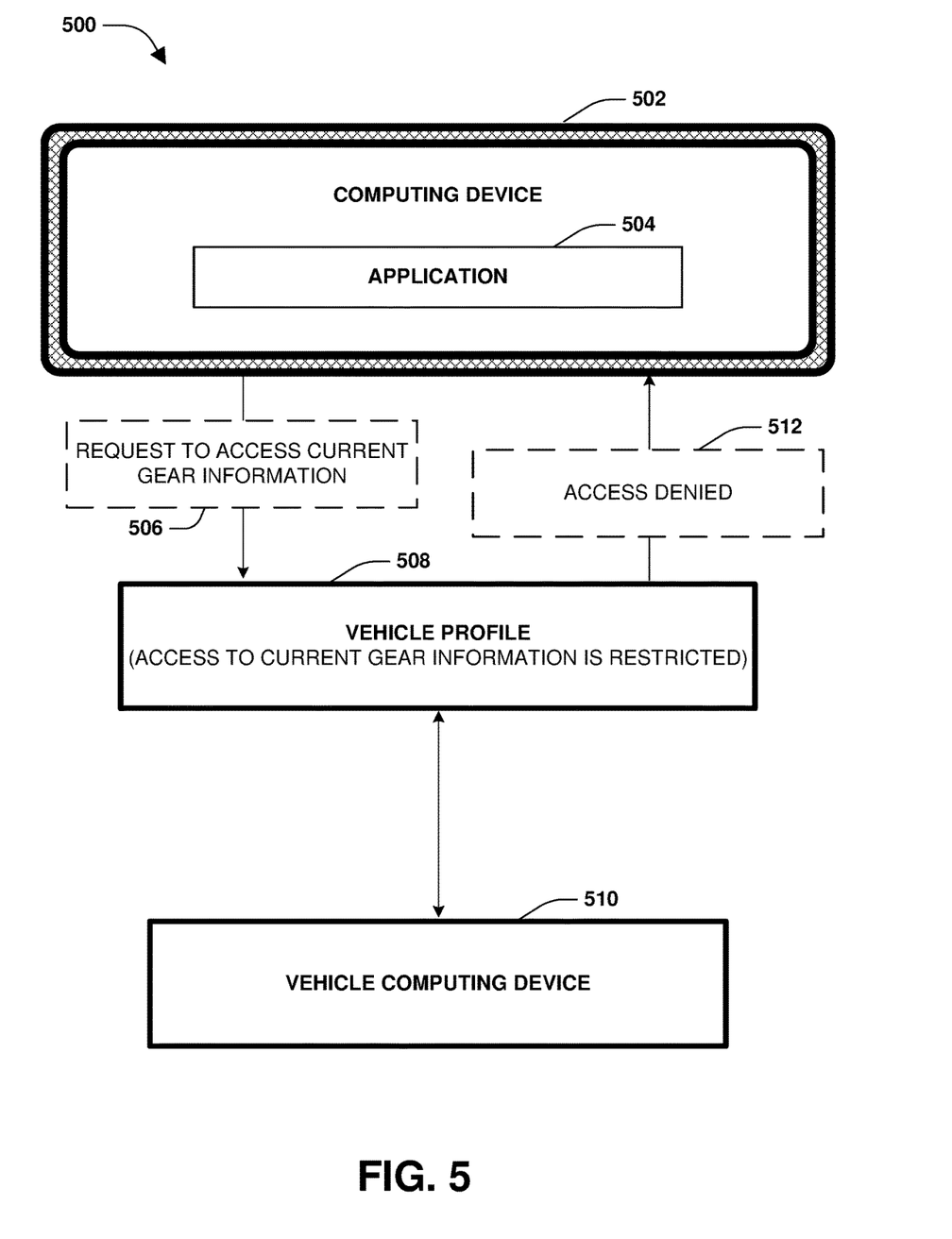
FIG. 5 is a component block diagram illustrating an exemplary system for utilizing a vehicle profile to facilitate interaction between an application and a vehicle computing device, where access to certain vehicle information is denied.

FIG. 5 illustrates an example of a system 500 for utilizing a vehicle profile 508. A computing device 502 may host an application 504 (e.g., a mobile device hosting a mobile app, an application executing on a device separate from a vehicle such as a wearable device, an application executing on a vehicle navigation unit, etc.). The application may request 506 access to current gear information, of a vehicle, from a vehicle computing device 510. The request 506 may be sent to a vehicle profile 508. The vehicle profile 508 may determine that the application 504 is not allowed to access the current gear information. Accordingly, the vehicle profile 508 deny access 512 to the current gear information.

Figure 6:
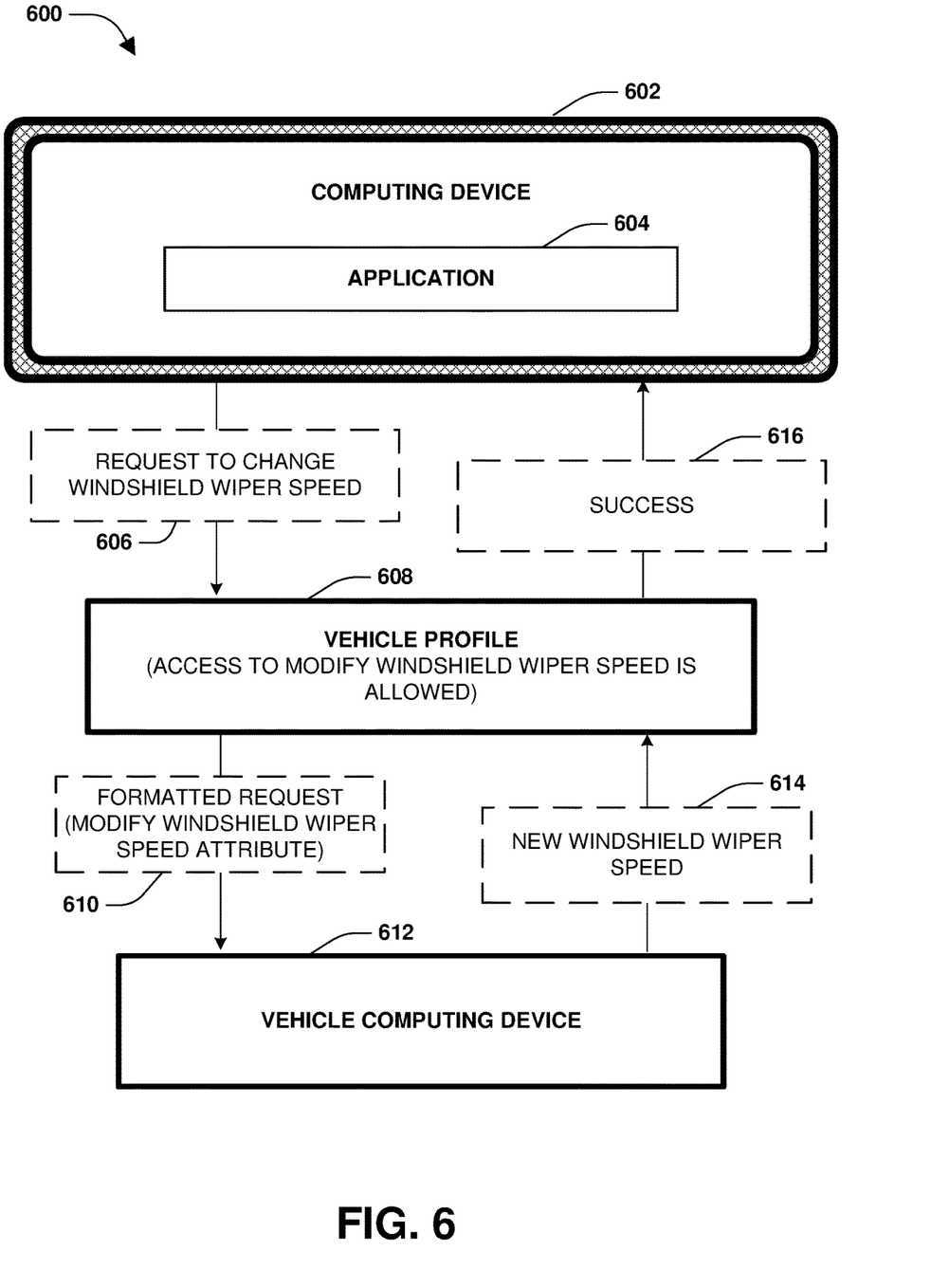
FIG. 6 is a component block diagram illustrating an exemplary system for utilizing a vehicle profile to facilitate interaction between an application and a vehicle computing device, where modification to a vehicle parameter is allowed.

FIG. 6 illustrates an example of a system 600 for utilizing a vehicle profile 608. A computing device 602 may host an application 604 (e.g., a mobile device hosting a mobile app, an application executing on a device separate from a vehicle such as a wearable device, an application executing on a vehicle navigation unit, etc.). The application may request 606 access to modify a windshield wiper speed of windshield wipers of a vehicle. The request 606 may be sent to a vehicle profile 608. The vehicle profile 608 may determine that the application 604 is allowed to modify the windshield wiper speed. Accordingly, the vehicle profile 608 may format the request 606 into a format understood by a vehicle computing device 612 that controls the windshield wipers. In this way, a formatted request 610 may be generated and sent to the vehicle computing device 612. The vehicle profile 608 may receive a new windshield wiper speed value 614 from the vehicle computing device 612. The vehicle profile 608 may send a success message 616 to the application 604 based upon receiving the new windshield wiper speed value 614.

Figure 7:
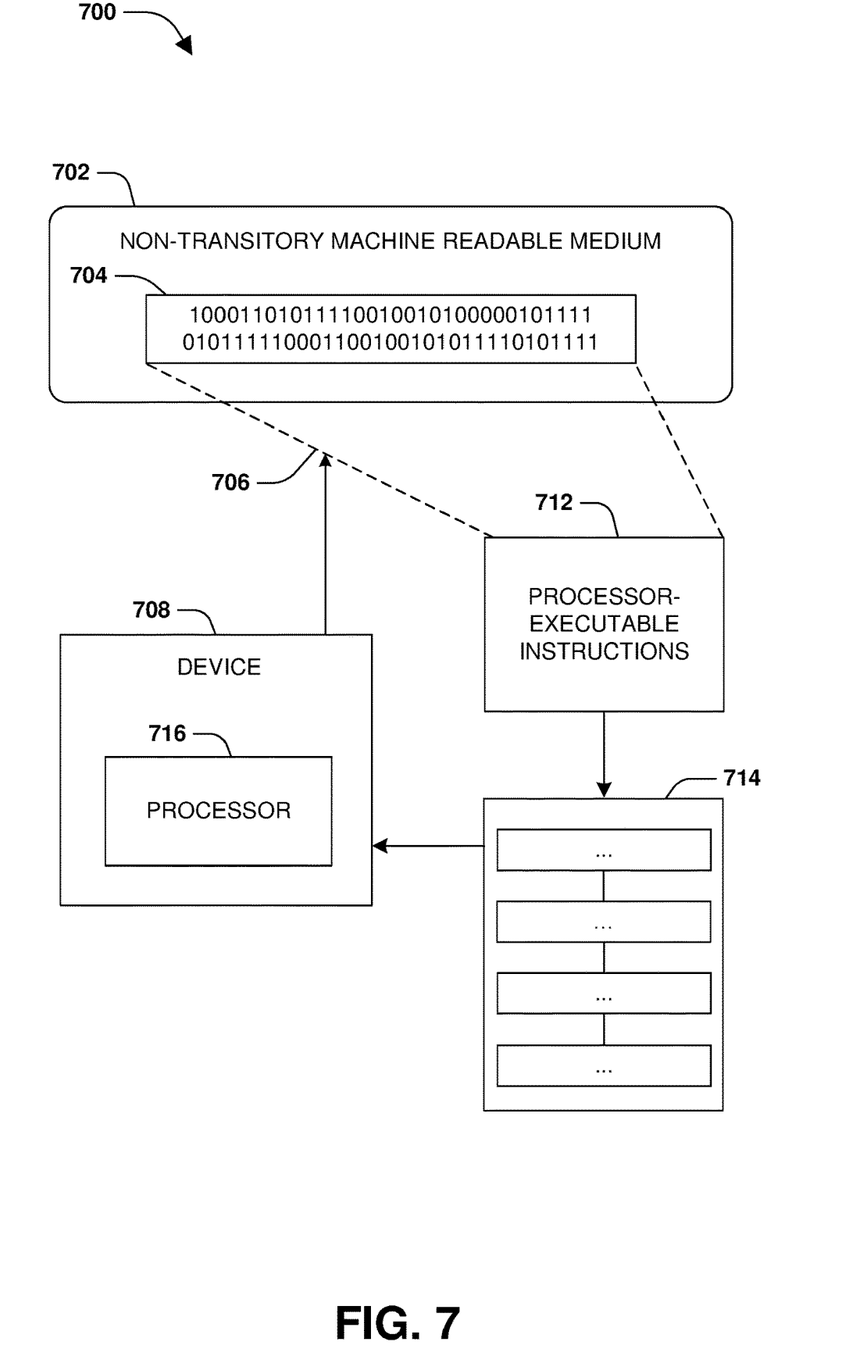
FIG. 7 is an illustration of an exemplary computing device-readable medium wherein processor-executable instructions configured to embody one or more of the provisions set forth herein may be comprised.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein. The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 702 stores computer-readable data 704 that, when subjected to reading 706 by a device 708 (e.g., a read head of a hard disk drive, or a read operation invoked on a solid-state storage device), express the processor-executable instructions 712. In some embodiments, the processor-executable instructions 712, when executed cause performance of operations, such as at least some of the example method 100 of FIG. 1, for example. In some embodiments, the processor-executable instructions 712 are configured to cause implementation of a system, such as at least some of the example system 200 of FIG. 2, at least some of the example system 300 of FIG. 3, at least some of the exemplary system 400 of FIG. 4, at least some of the exemplary system 500 of FIG. 5, and/or at least some of the example system 600 of FIG. 6, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
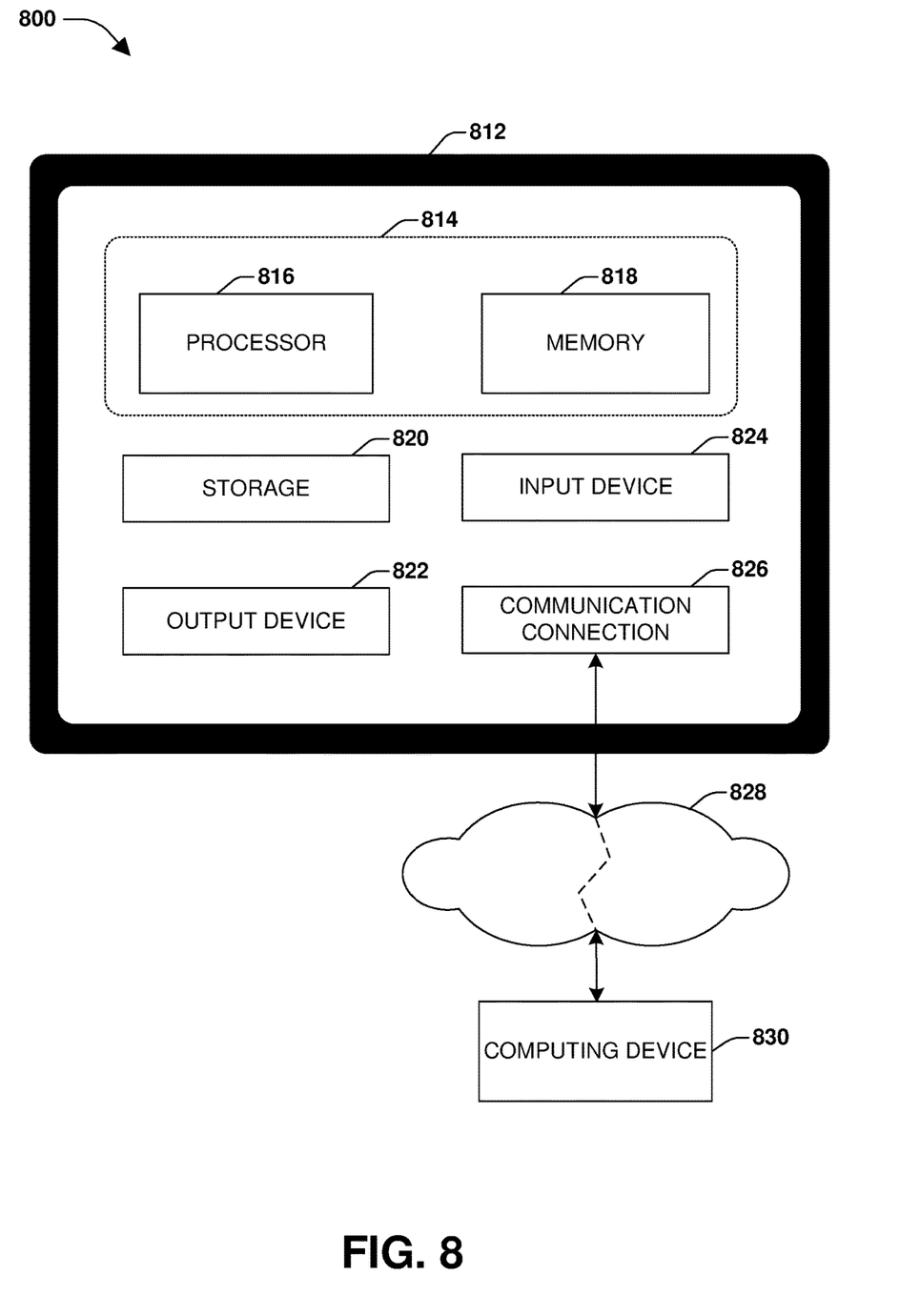
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 812 configured to implement one or more embodiments provided herein. In one configuration, computing device 812 includes at least one processor 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processor 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Computer storage media does not, however, include propagated signals. Rather, computer storage media excludes propagated signals. Any such computer storage media may be part of device 812.

Device 812 may also include communication connection 826 that allows device 812 to communicate with other devices. Communication connection 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection 826 may include a wired connection or a wireless connection. Communication connection 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device 824 such as keyboard, mouse, pen, voice input device, touch input device, infrared cameras, video input devices, and/or any other input device. Output device 822 such as one or more displays, speakers, printers, and/or any other output device may also be included in device 812. Input device 824 and output device 822 may be connected to device 812 via a wired connection, wireless connection, or any combination thereof. In one embodiment, an input device or an output device from another computing device may be used as input device 824 or output device 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A computing device comprising:
   a processor; and
   memory comprising processor-executable instructions that when executed by the processor cause performance of operations, the operations comprising:
      exposing a vehicle profile development environment to a profile developer;
      populating the vehicle profile development environment with an input type definition interface, a notification rule definition interface, and a display rule definition interface;
      responsive to receiving an input type definition through the input type definition interface, defining an input type rule for inclusion within a vehicle profile, the input type rule specifying how the vehicle profile is to interpret input received from an application accessing a feature of a vehicle;
      responsive to receiving a notification rule definition through the notification rule definition interface, defining a notification rule for inclusion within the vehicle profile, the notification rule specifying what notifications can be provided to a user of the application based upon signal information output by a vehicle computing device of the vehicle;
      responsive to receiving a display rule definition through the display rule definition interface, defining a display rule for inclusion within the vehicle profile, the display rule specifying how to visually format information from the application for display through a display of the vehicle computing device; and
      generating the vehicle profile for providing the application with access to features of the vehicle based upon at least one of the input type definition, the notification rule definition, or the display rule definition.

2. The computing device of claim 1, the operations comprising:
   receiving, through the vehicle profile development environment, a signal access rule specifying that a first type of signal information is allowed to be accessed by the application and that a second type of signal information is not allowed to be accessed by the application; and
   including the signal access rule within the vehicle profile.

3. The computing device of claim 1, the operations comprising:
   receiving, through the vehicle profile development environment, a vehicle configuration rule specifying that a first vehicle parameter is allowed to be modified by the application and that a second vehicle parameter is not allowed to be modified by the application; and
   including the vehicle configuration rule within the vehicle profile.

4. The computing device of claim 1, the operations comprising:
   receiving, through the vehicle profile development environment, an automated vehicle driving configuration rule specifying that a first automated driving vehicle parameter is allowed to be modified by the application and that a second automated driving vehicle parameter is not allowed to be modified by the application; and
   including the automated vehicle driving configuration rule within the vehicle profile.

5. The computing device of claim 1, the operations comprising:
   defining a general vehicle attribute specifying how the application is allowed to access a general feature of the vehicle, wherein the generating comprises:
      generating the vehicle profile for providing the application with access to features of the vehicle based upon the general vehicle attribute.

6. The computing device of claim 1, the operations comprising:
   defining a vehicle specific attribute specifying how the application is allowed to access a vehicle specific feature of the vehicle, wherein the generating comprises:
      generating the vehicle profile for providing the application with access to features of the vehicle based upon the vehicle specific attribute.

7. The computing device of claim 1, the operations comprising:
   utilizing the vehicle profile to provide the application with access to the features of the vehicle.

8. The computing device of claim 7, wherein the utilizing comprises:
   receiving information and a context describing the information from the application;
   using the vehicle profile to determine a display scheme regarding how to display the information based upon the context; and
   invoking the vehicle computing device to display the information based upon the display scheme.

9. The computing device of claim 8, wherein the invoking comprises:
   allowing display of a first portion of the information based upon the display rule; and
   restricting display of a second portion of the information based upon the display rule.

10. The computing device of claim 8, wherein the invoking comprises:
    identifying supplementary information, not comprised within the information received from the application, based upon the vehicle profile; and
    invoking the vehicle computing device to display the supplementary information.

11. The computing device of claim 7, wherein the utilizing comprises:
    receiving information from the application;
    formatting the information based upon the vehicle profile to create formatted information; and
    invoking the vehicle computing device to provide the formatted information.

12. The computing device of claim 11, wherein the formatting comprises:
    transforming text of the information into audio output for playback through the vehicle.

13. The computing device of claim 7, wherein the utilizing comprises:
    utilizing the vehicle profile to receive first signal information from the vehicle computing device;
    formatting the first signal information using the vehicle profile into a contextual concept; and
    providing the contextual concept to the application.

14. The computing device of claim 1, the operations comprising:

defining an attribute specifying an action that the vehicle computing device will perform in response to an input command from the application.

15. The computing device of claim 14, wherein the input command corresponds to first input received through a mobile device hosting the application.

16. The computing device of claim 1, the operations comprising:
receiving an update from a vehicle manufacturer of the vehicle; and
applying the update to the vehicle profile to create an updated vehicle profile.

17. The computing device of claim 16, wherein the update at least one of:
specifies a new attribute associated with a new feature for the vehicle, or
changes access rights to a first feature of the vehicle.

18. The computing device of claim 1, wherein the generating comprises at least one of:
specifying, within the vehicle profile, a first set of features of the vehicle that are allowed to be accessed by the application; or
specifying, within the vehicle profile, a second set of features of the vehicle that are not allowed to be accessed by the application.

19. A method of developing a vehicle profile, the method involving a computing device comprising a processor, and the method comprising:
exposing a vehicle profile development environment to a profile developer;
populating the vehicle profile development environment with an input type definition interface, a notification rule definition interface, and a display rule definition interface;
responsive to receiving an input type definition through the input type definition interface, defining an input type rule for inclusion within a vehicle profile, the input type rule specifying how the vehicle profile is to interpret input received from an application accessing a feature of a vehicle;
responsive to receiving a notification rule definition through the notification rule definition interface, defining a notification rule for inclusion within the vehicle profile, the notification rule specifying what notifications can be provided to a user of the application based upon signal information output by a vehicle computing device of the vehicle;
responsive to receiving a display rule definition through the display rule definition interface, defining a display rule for inclusion within the vehicle profile, the display rule specifying how to visually format information from the application for display through a display of the vehicle computing device; and
generating the vehicle profile for providing the application with access to features of the vehicle based upon at least one of the input type definition, the notification rule definition, or the display rule definition.

20. A non-transitory machine readable medium having stored thereon processor-executable instructions that when executed cause performance of operations, the operations comprising:
exposing a vehicle profile development environment to a profile developer;
populating the vehicle profile development environment with an input type definition interface, a notification rule definition interface, and a display rule definition interface;
responsive to receiving an input type definition through the input type definition interface, defining an input type rule for inclusion within a vehicle profile, the input type rule specifying how the vehicle profile is to interpret input received from an application accessing a feature of a vehicle;
responsive to receiving a notification rule definition through the notification rule definition interface, defining a notification rule for inclusion within the vehicle profile, the notification rule specifying what notifications can be provided to a user of the application based upon signal information output by a vehicle computing device of the vehicle;
responsive to receiving a display rule definition through the display rule definition interface, defining a display rule for inclusion within the vehicle profile, the display rule specifying how to visually format information from the application for display through a display of the vehicle computing device; and
generating the vehicle profile for providing the application with access to features of the vehicle based upon at least one of the input type definition, the notification rule definition, or the display rule definition.

* * * * *